(12) United States Patent
Fueki et al.

(10) Patent No.: US 10,896,542 B2
(45) Date of Patent: Jan. 19, 2021

(54) MOVING BODY IMAGE GENERATION RECORDING DISPLAY DEVICE AND PROGRAM PRODUCT

(71) Applicant: CANDERA JAPAN INC., Tokyo (JP)

(72) Inventors: Kazumasa Fueki, Tokyo (JP); Noboru Takahashi, Tokyo (JP)

(73) Assignee: CANDERA JAPAN INC., Tokyo (JP)

( * ) Notice: Subject to any disclaimer, the term of this patent is extended or adjusted under 35 U.S.C. 154(b) by 0 days.

(21) Appl. No.: 16/837,981

(22) Filed: Apr. 1, 2020

(65) Prior Publication Data

US 2020/0234497 A1  Jul. 23, 2020

Related U.S. Application Data

(63) Continuation of application No. PCT/JP2018/036758, filed on Oct. 1, 2018.

(30) Foreign Application Priority Data

Oct. 2, 2017  (JP) ................................. 2017-192431

(51) Int. Cl.
*G06T 19/00* (2011.01)
*G06K 9/00* (2006.01)
*G06T 15/08* (2011.01)

(52) U.S. Cl.
CPC ........ *G06T 19/003* (2013.01); *G06K 9/00798* (2013.01); *G06K 9/00825* (2013.01); *G06T 15/08* (2013.01); *G06T 2200/24* (2013.01)

(58) Field of Classification Search
None
See application file for complete search history.

(56) References Cited

U.S. PATENT DOCUMENTS

| 6,289,278 | B1 | 9/2001 | Endo et al. |
| 2005/0108180 | A1 | 5/2005 | Iwane |

(Continued)

FOREIGN PATENT DOCUMENTS

| JP | H11-250396 A | 9/1999 |
| JP | H11-339192 A | 12/1999 |

(Continued)

*Primary Examiner* — Ke Xiao
*Assistant Examiner* — Jed-Justin Imperial
(74) *Attorney, Agent, or Firm* — Hauptman Ham, LLP

(57) ABSTRACT

A moving body position information recognition display device includes a traveling state obtaining part for obtaining information on a traveling state of a host moving body. An object information obtaining part for obtaining information on a plurality of objects including a shape of a travel road and another moving body. A virtual space construction part for constructing a virtual space by associating at least the host moving body and each of the plurality of objects with each of a plurality of virtual models and by arranging the associated virtual models in a three-dimensional space. A two-dimensional video generation part for generating a two-dimensional video capturing the virtual space from a virtual camera arranged in the virtual space and output the two-dimensional video. The two-dimensional video generation part generates the two-dimensional video while adding a predetermined effect to the virtual model corresponding to the object in the two-dimensional video.

6 Claims, 8 Drawing Sheets

(56) References Cited

U.S. PATENT DOCUMENTS

| | | | |
|---|---|---|---|
| 2007/0003162 A1 | 1/2007 | Miyoshi et al. | |
| 2011/0109723 A1* | 5/2011 | Ashbey | G06T 11/00 348/44 |
| 2013/0293582 A1* | 11/2013 | Ng-Thow-Hing | G06T 7/73 345/633 |
| 2014/0278065 A1* | 9/2014 | Ren | G06T 17/00 701/454 |
| 2015/0294492 A1* | 10/2015 | Koch | H04N 13/243 345/426 |

FOREIGN PATENT DOCUMENTS

| | | |
|---|---|---|
| JP | 2002-278662 A | 9/2002 |
| JP | 2003-216981 A | 7/2003 |
| JP | 2006-107521 A | 4/2006 |
| JP | 2011-182059 A | 9/2011 |
| JP | 2012-253428 A | 12/2012 |
| WO | 2005/088970 A1 | 9/2005 |

* cited by examiner

MOVING BODY IMAGE GENERATION RECORDING DISPLAY DEVICE AND PROGRAM PRODUCT

CROSS-REFERENCE TO RELATED APPLICATION

This is a Continuation Application of PCT Application No. PCT/JP2018/036758 filed Oct. 1, 2018, which was not published under PCT Article 21 (2) in English.

This application is based on and claims priority from the prior Japanese Patent Application No. 2017-192431 filed on Oct. 2, 2017, the entire disclosure of which and the above PCT Application are herein incorporated by reference.

TECHNICAL FIELD

The present invention relates to a device which generates an image of an object in a periphery of a moving body to record or display the image and to a program for performing such operations.

BACKGROUND ART

There is an image conversion technique in which images captured by using cameras installed in a moving body such as an automobile are processed and converted to images similar to images of the moving body as viewed from various directions. There is a technique such as so-called "around view monitor" (registered trademark) in which images captured by using multiple cameras mounted in a moving body are synthesized to generate a bird's-eye view image of a region of a certain range from the moving body. Such an image synthesizing technique is used, for example, in driving in reverse, doing parallel parking, and the like to display, on a monitor, other moving bodies, objects, and the like at positions hard to see from a driver seat of the moving body and present them to the driver.

In the image synthesizing technique as described above, the actual captured image is converted and displayed on a display device in the vehicle. Accordingly, when a target of image capturing is temporarily blocked by another moving body or moves to a blind spot of the camera, this target cannot be displayed in some cases.

Moreover, there is a drive recorder which records traveling of a moving body as a video. One drive recorder is generally installed near a windshield of the moving body and a large-capacity storage device is necessary to record the video.

The conventional art is described below.

There is a technique as follows (for example, see Patent Document 1). An apparatus includes an input device, a virtual model database, a virtual model conversion device, a virtual model reconfiguration device, a virtual model processing device, and a control device or a display device. The virtual model conversion device recognizes information on multiple targets obtained from the input device, identifies a virtual model corresponding to each target in the virtual model database, and substitutes the targets with the virtual models. The virtual model reconfiguration device reconfigures the targets and relationships between the targets to virtual models and relationships between the virtual models corresponding thereto in a virtual space. The virtual model processing device understands and determines the virtual models and the relationships between the virtual models based on the reconfigured virtual models and the relationships between the virtual models and gives instructions to the control device or the display device.

Moreover, there is a technique as follows (for example, see Patent Document 2). A navigation device generates a traveling road shape by using map information stored in the navigation device. This can achieve more realistic road display. Moreover, the navigation device performs calculation such that a display position of a host vehicle is fixed to a predetermined one point in a display and performs operation such that a mark indicating the position of the host vehicle, a mark indicating the position of a following vehicle, and a mark indicating the position of a peripheral vehicle other than the following vehicle are displayed to be superimposed on a road. This allows a user to easily determine a distance interval between the host vehicle and the peripheral vehicle.

Moreover, there is a technique as follows (for example, see Patent Document 3). When the positions of other vehicles relative to a host vehicle are to be displayed, an image can be displayed by using image information of CCD cameras and the like. In this case, the vehicle types and the like of the other vehicles are received from data in communication processing and three-dimensional information of the other vehicles and map information (terrain information) of the periphery are read from a database. Then, three-dimensional models of the vehicles and the terrain are arranged and rendered in real time to match measurement results, based on detection results of the positions of the other vehicles relative to the host vehicle. This allows the vehicles and the terrain to be displayed on a display device as an artificial reality virtual image. The viewpoint of the virtual image is movable and an image from a freely-moved viewpoint can be displayed. For example, it is possible to display an operation lever in a portion of a display screen and move the viewpoint by operating the operation lever in any of directions of up, down, left, and right. Moving the viewpoint upward allows a user to three-dimensionally grasp an overall condition from a high position and three-dimensionally check presence of a vehicle in front which is blocked from view by a vehicle just in front of the host vehicle. Moreover, when the viewpoint is moved to such a position that the vehicles and the like are viewed from the side of the road, states of the host vehicle and the other vehicles in front of and behind the host vehicle can be displayed from the side from the third person point of view.

Moreover, there is a technique in which viewpoint converted image generation means synthesizes a vehicle model image, rendered to be modeled on a vehicle, with a portion of a viewpoint converted image corresponding to the vehicle (for example, see Patent Document 4).

PRIOR ART DOCUMENTS

Patent Documents

Patent Document 1: Japanese Patent Application Publication No. 2003-216981
Patent Document 2: Japanese Patent Application Publication No. Hei 11-250396
Patent Document 3: Japanese Patent Application Publication No. 2006-107521
Patent Document 4: Japanese Patent Application Publication No. 2011-182059

SUMMARY OF THE INVENTION

Problems to be Solved by the Invention

In techniques in which videos of a periphery of a moving body captured by multiple cameras are synthesized as described above, a portion outside the fields of view of the cameras is sometimes not displayed. Moreover, there is a limit to displaying the video of the periphery of the moving body from a freely-moved viewpoint.

In techniques of constructing a virtual space by using virtual models as described above, there are needs for displaying the virtual models as a two-dimensional image in a manner easily understandable for the operator (driver).

Regarding a drive recorder mounted in a moving body, only one drive recorder is installed near the windshield in most cases. Thus, the drive recorder is used to record only a video in a forward direction of the moving body and does not record videos in the other directions. Moreover, a large capacity recording medium is necessary to always record the video during traveling. When multiple cameras are installed to record the situation of the periphery of the moving body, a storage device with an even larger capacity is necessary.

The disclosed technique is made in view of the aforementioned problems of the conventional art and an object is to provide information in a form easier to understand for a driver when an environment around a moving body driven by the driver is displayed as a video and to record a travel state of the moving body with a smaller storage capacity.

Means for Solving the Problems

The disclosed technique provides a moving body position information recognition display device including: a traveling state obtaining part configured to obtain information on a traveling state of a host moving body including a position and speed of the host moving body; an object information obtaining part configured to obtain information on a plurality of objects including a shape of a travel road and another moving body present in a periphery of the host moving body; a virtual space construction part configured to construct a virtual space by associating at least the host moving body and the plurality of objects respectively with virtual models and arranging the virtual models in a three-dimensional space based on the information obtained from the traveling state obtaining part and the object information obtaining part; and a two-dimensional video generation part configured to generate a two-dimensional video capturing the virtual space from a virtual camera arranged in the virtual space and output the two-dimensional video to a display screen. The two-dimensional video generation part generates the two-dimensional video while adding a predetermined effect to display of the virtual model corresponding to each of the objects in the two-dimensional video depending on speed of the object relative to the host moving body.

Effects of the Invention

The disclosed technique can provide information in a form easier to understand when an environment around a host moving body is displayed as a video and record a travel state of the moving body with a smaller storage capacity.

EMBODIMENTS FOR CARRYING OUT THE INVENTION

Figure 1A:
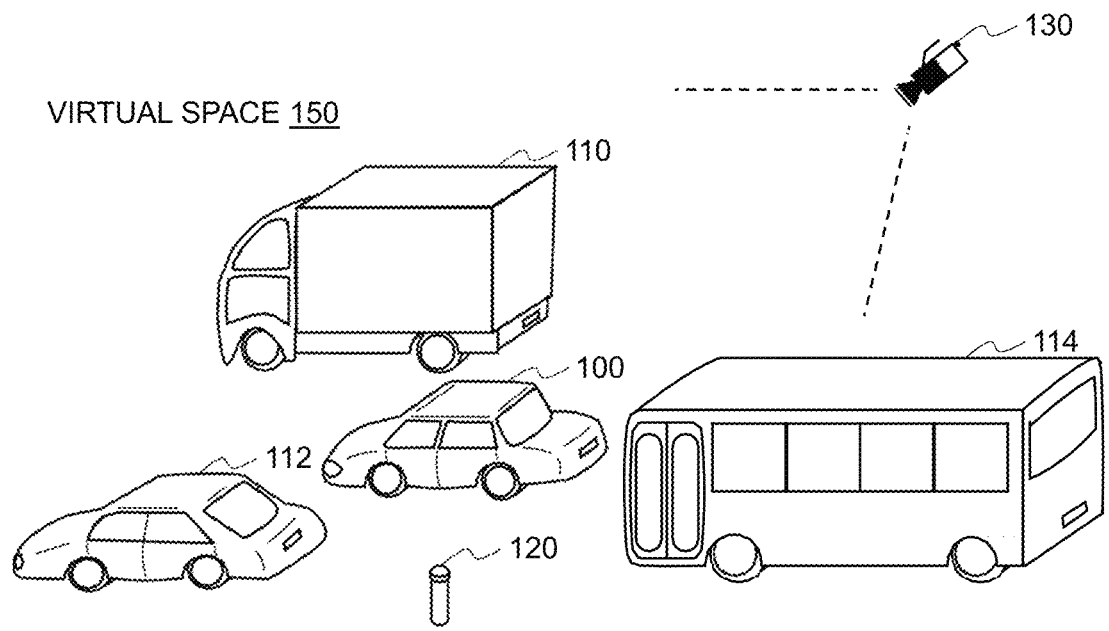
FIGS. 1A and 1B is a view illustrating examples of a virtual space and sensors installed in an actual moving body in one embodiment.
Figure 1B:
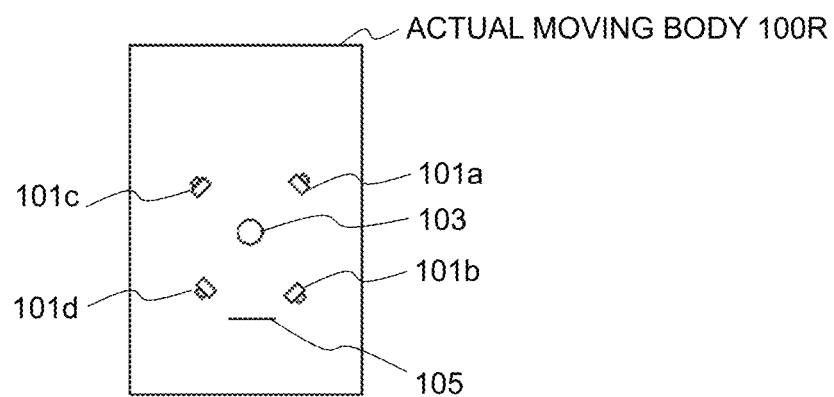

FIGS. 1A and 1B are a view illustrating examples of a virtual space and sensors installed in an actual moving body in one embodiment.

A virtual space 150 illustrated in FIG. 1A is constructed based on information such as video information on peripheral objects sent from cameras (101a to 101d) installed in an actual moving body 100R illustrated in FIG. 1B, information on relative speed, positions, and the like of the peripheral objects obtained by a radar 103, information of GPS received by a radio antenna 105, various kinds of information sent from other systems connected to a radio network, and information on the actual moving body 100R obtained from sensors (not illustrated) such as a speedometer, an accelerometer, and a gyroscope installed in the moving body 100R.

The cameras (101a to 101d), the radar 103, the radio antenna 105, and the sensors (not illustrated) such as the speedometer described above are examples and other appropriate information gathering devices may be used. Moreover, these devices for gathering information may be installed inside the actual moving body 100R or outside the actual moving body 100R.

In the virtual space 150 in FIG. 1A, a virtual camera 130 is desirably set such that a virtual moving body 100 corresponding to the actual moving body 100R illustrated in FIG. 1B is located at substantially the center in an imaging direction of the virtual camera 130. In the virtual camera 130, various parameters can be set, which are used by a virtual imaging system of the virtual camera 130 for conversion of the virtual space 150 to a two-dimensional image. The parameters of the virtual camera 130 include, for example, the position, imaging direction, focal distance, angle of field, and the like of the virtual camera 130 in the virtual space. The depth of field is a parameter indicating depth in which objects are in focus in a virtual lens system and, in the embodiment, is desirably set to pan focus (specifically, set such that virtual objects present within any distance from the virtual camera 130 are in focus).

In FIG. 1A, stationary objects, other moving bodies traveling in a periphery of the actual moving body 100R in an actual space, and the like are recognized from the aforementioned various kinds of information. In the embodiment of the present invention, the other moving bodies, stationary objects, and the like in the actual space are respectively associated with virtual models with reference to a 3D model database and the virtual models are arranged in the virtual space 150.

In the virtual space of FIG. 1A, a truck 110, an automobile 112, a bus 114, and a roadside pole 120 are arranged in the periphery of the virtual moving body 100 in the virtual space corresponding to the actual moving body 100R. These virtual models present in the virtual space 150 correspond to the respective objects present in the actual space with respect to the virtual moving body 100 and constantly move relative to the virtual moving body 100 in the virtual space 150 depending on the movement of the actual objects relative to the actual moving body 100R.

In the embodiment, it is desirable that the virtual imaging system of the virtual camera 130 moves in the same direction as the virtual moving body 100 such that the virtual moving body 100 is always arranged at the center of the screen and the virtual imaging system follows the virtual moving body 100 such that the virtual moving body 100 is arranged at the center of the screen. Note that it is desirable that the relative distance between the virtual camera 130 and the virtual moving body 100 and the parameters of the imaging system of the virtual camera can be freely set based on instructions of an operator (driver) riding in the actual moving body 100R. A display device is desirably installed near a driver seat such that the operator (driver) or the like of the actual moving body 100R can view a video captured by the virtual camera 130.

Note that, for example, recognized two-wheelers and humans can also be placed in the virtual space. Accordingly, in the embodiment, it is desirable that comprehensiveness of recognizable objects is guaranteed for actual objects which need to be recognized in driving of the driver so that such objects can be arranged in the virtual space.

Although oncoming vehicles of the actual moving body 100R are not illustrated in the virtual space of FIG. 1A, the oncoming vehicles are also desirably included in the recognition targets.

Figure 2:
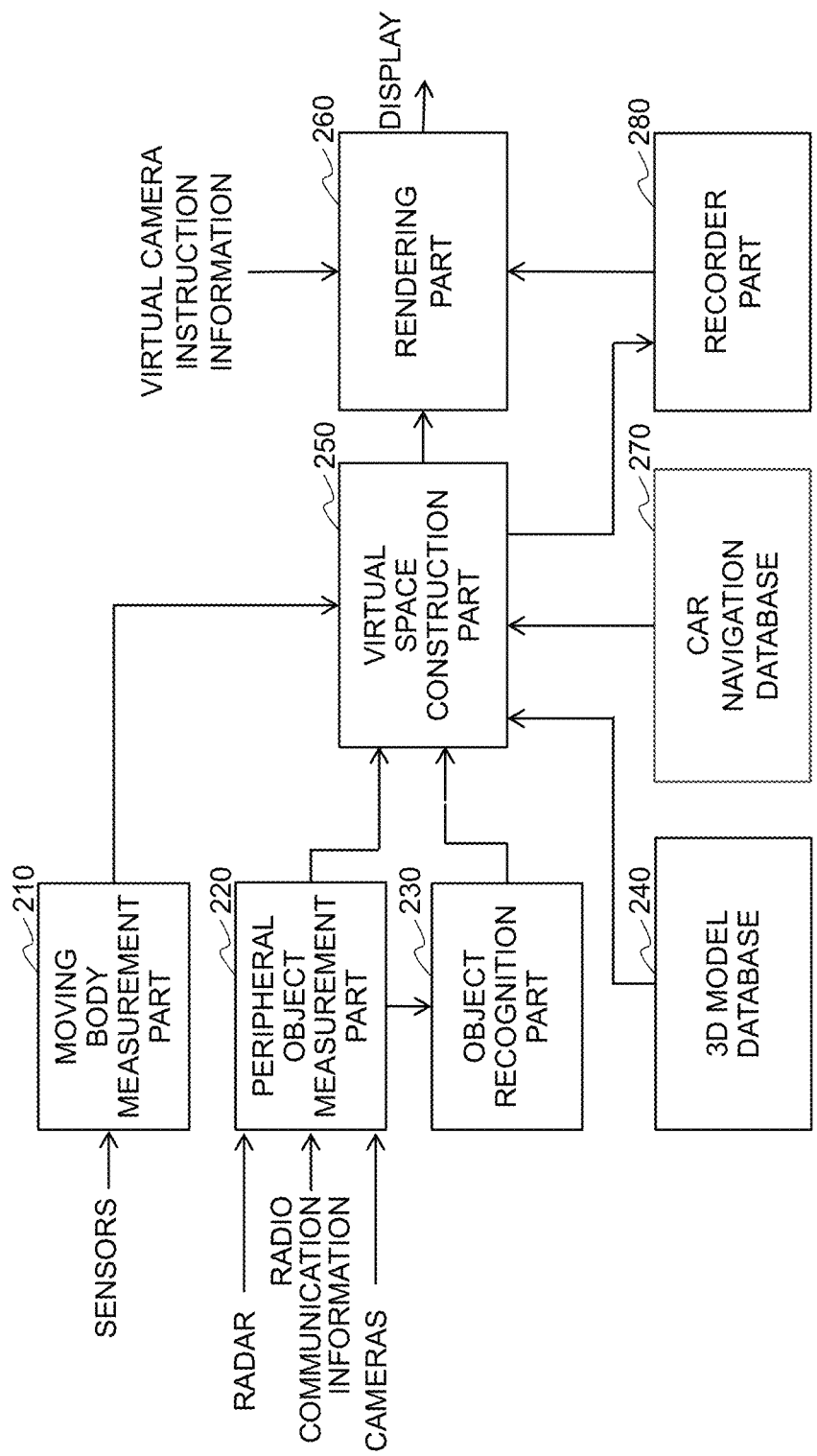
FIG. 2 is a functional block diagram of one embodiment.

FIG. 2 is a functional block diagram of one embodiment. A moving body measurement part 210 receives information from the sensors (not illustrated) such as the speedometer, the accelerometer, and the gyroscope installed in the actual moving body 100R. The information on the actual moving body 100R obtained in the moving body measurement part 210 is sent to a virtual space construction part 250.

A peripheral object measurement part 220 receives the video information on the other moving bodies and objects in the periphery sent from the cameras (101a to 101d) installed in the actual moving body 100R, the information on relative speed, positions, and the like of the other moving bodies and objects in the periphery obtained by the radar 103, the information of GPS received by the radio antenna 105, and the various kinds of information (road information, videos from cameras installed on roads, and the like) from other systems connected to the radio network. The information received by the peripheral object measurement part 220 is sent to the virtual space construction part 250 and an object recognition part 230.

The object recognition part 230 recognizes the other moving bodies present in the periphery and the objects such as poles on the road based on the information received by the peripheral object measurement part 220 and sends results of the recognition to the virtual space construction part 250.

The virtual space construction part 250 obtains the shape of a road from a car navigation database 270 and creates a model of the road in the virtual space 150. Moreover, the virtual space construction part 250 arranges the virtual moving body 100 corresponding to the actual moving body 100R on the aforementioned virtual road created in the virtual space 150 based on the information from the moving body measurement part 210 and causes the virtual moving body 100 to travel on the virtual road at speed corresponding to the actual moving body 100R. The three-dimensional shape of the virtual moving body 100 may be stored in the virtual space construction part 250 or obtained from a 3D model database 240.

Furthermore, the virtual space construction part 250 obtains the virtual models corresponding to the other moving bodies and objects in the periphery from the 3D model database based on the information obtained from the object recognition part 230. The virtual space construction part 250 arranges the obtained virtual models corresponding to the other moving bodies and objects in the periphery in the virtual space. The virtual space construction part 250 causes the virtual models corresponding to the other moving bodies and objects in the periphery to travel on the virtual road based on the information of the peripheral object measurement part 220.

Moreover, the virtual space construction part 250 sends the information on the virtual space to a rendering part 260 and a recorder part 280.

The rendering part 260 sets the parameters of the virtual camera 130 based on virtual camera instruction information given by the operator (driver) and sends the information on imaging of the virtual space 150 to the display device.

The rendering part 260 generates a two-dimensional video of the virtual space 150 captured from the virtual camera 130. The generated two-dimensional video is sent to the display device. For each of the other peripheral moving bodies moving relative to the virtual moving body 100, the rendering part may display ghosts of the peripheral moving body in a discontinuous manner or display a video of the other peripheral moving body a predetermined time before the current time point in a manner superimposed on the two-dimensional image such that, for example, the farther back in time the video is from, the higher the transparency of the video is, to make the speed of the peripheral moving body relative to the virtual moving body 100 easily recognizable. Alternatively, the rendering part may add trajectory (blurring) of the peripheral moving body to make the moving condition of the peripheral moving body recognizable. How far in the past to go back to display the ghost or video of the other moving body may be determined in advance or changed as appropriate based on an instruction of the operator (driver).

Note that ghosts (image lag), a past video, or the like may not be displayed for the host moving body, an oncoming moving body, a moving body whose absolute value of speed relative to the host moving body or absolute value of speed change relative to the host moving body is smaller than a predetermined value, a moving body whose speed is lower than the host moving body, a stationary object, or the like. Alternatively, ghosts, a past video, or the like may not be displayed for some of these moving bodies and object. Moreover, an effect of display may vary depending on the types or characteristics of the moving bodies and object.

The recorder part 280 stores the information on the virtual space changing from moment to moment in a memory 704 or a storage medium 760. The information stored in the recorder part is information on the virtual space 150. Accordingly, it is possible to record information more compressed than the information of a drive recorder which records the actual traveling video. Thus, a consumed storage capacity can be reduced. Moreover, the recorded information on the virtual space changing from moment to moment allows the virtual space to be displayed on a display as a two-dimensional image with a viewpoint changed in later reproduction of the recorded information by moving the virtual camera.

Figure 3:
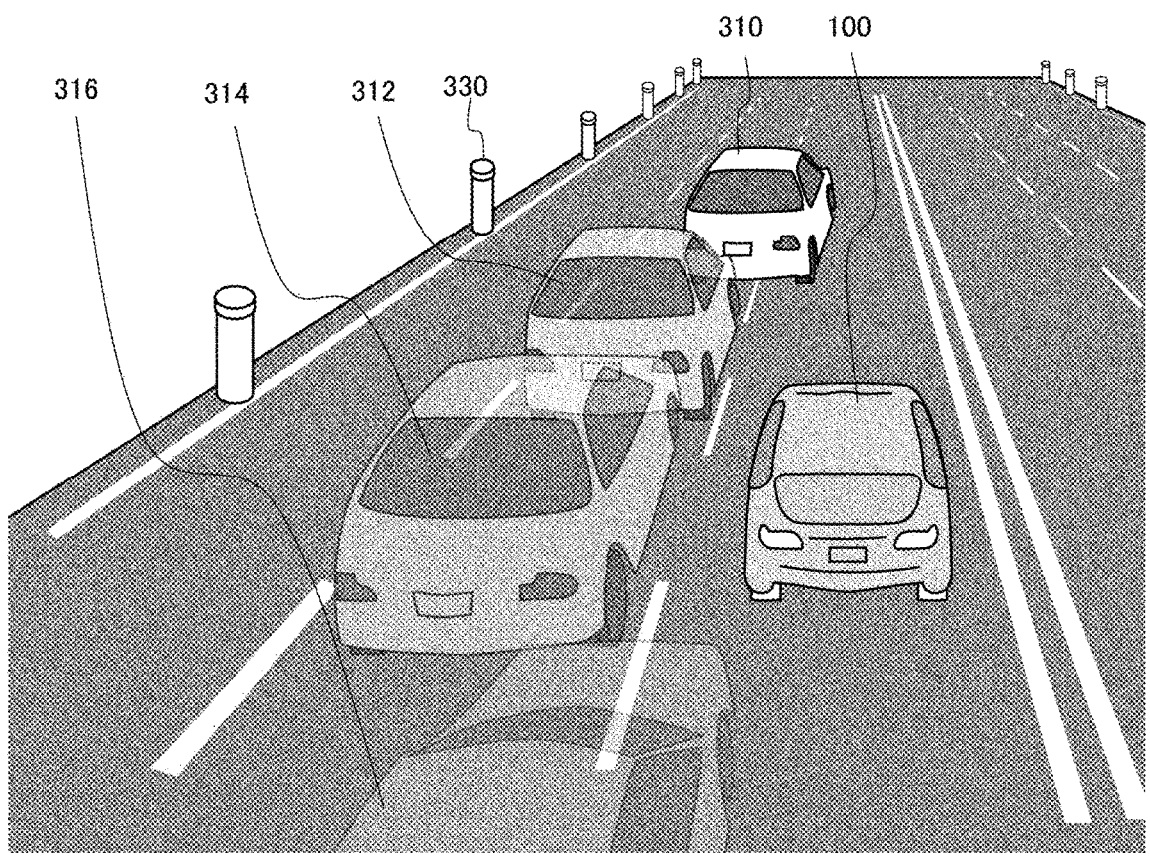
FIG. 3 is a view illustrating an example of a first display image in one embodiment.

FIG. 3 is a view illustrating an example of a first display image in one embodiment. The image of FIG. 3 is an image of the virtual space 150 captured by the virtual camera 130. There are displayed the virtual moving body 100 at the current time point, a peripheral moving body 310 at the current time point, and poles 330 present on the roadside at the current time point.

In FIG. 2, a ghost 312, a ghost 314, and a ghost 316 are ghosts of the peripheral moving body 310.

For example, the ghost 312 may be a ghost of the peripheral moving body 310 a time d before the current time point. Moreover, the ghost 312 may be an image whose transparency is increased from that of the peripheral moving body 310 by Δ %. Accordingly, the ghost 312 may be an image always the time d before the peripheral moving body 310 with a transparency increased from that of the peripheral moving body 310 by Δ %. In this case, when the speed of the peripheral moving body 310 is higher than the virtual moving body 100, the ghost 312 seems to be following the peripheral moving body 310. Note that the "transparency" described above is a term used such that transparency of 100% means a completely transparent state and transparency of 0% means a completely opaque state.

Alternatively, the ghost 312 may be an instantaneous image of the peripheral moving body 310 a predetermined time before a certain time point with a transparency increased from that of the virtual moving body 100 by Δ %. Specifically, the peripheral moving body 310 may leave a ghost every predetermined interval time d. In this case, when the speed of the peripheral moving body 310 is higher than the virtual moving body 100, the ghost 312 seems such that the peripheral moving body 310 is moving while leaving a still image of the peripheral moving body 310 every predetermined interval d with a transparency of the still image increased from that of the virtual moving body 100 by Δ %.

The ghost 314 may be an image the time d before the ghost 312 with a transparency further increased from that of the ghost 312 by Δ %. The ghost 316 may be an image the time d before the ghost 314 with a transparency further increased from that of the ghost 314 by Δ %. Note that the value by which the transparency is increased may vary among the ghosts. Moreover, the interval d of the ghost may vary among the ghosts. Note that how many ghosts are left may be determined in advance. Alternatively, the ghost may be deleted and excluded from rendering targets when the transparency of the ghost is increased and reaches or exceeds 100%.

Generating the video while leaving the ghosts of the peripheral moving body 310 as described above allows the driver to know how fast the peripheral moving body 310 is moving relative to the virtual moving body 100.

Although description is given above of the example in which the virtual camera 130 is moved such that the virtual moving body 100 is stationary in the image even when the speed of the virtual moving body 100 changes, the image may be generated such that the virtual moving body 100 moves.

Although only one peripheral moving body 310 is illustrated in the example of FIG. 3, multiple peripheral moving bodies may be similarly displayed. Moreover, an oncoming vehicle may be displayed. The peripheral moving body 310 is not limited to a four-wheeler and may be a two-wheeler, a bicycle, or the like.

The ghost 312, the ghost 314, and the ghost 316 are desirably displayed with relationships relative to the virtual moving body 100 maintained. Thus, the ghosts may be displayed with positional relationships relative to the stationary road or roadside poles not maintained.

Note that the stationary roadside poles 330 are desirably displayed without leaving ghosts.

Figure 4:
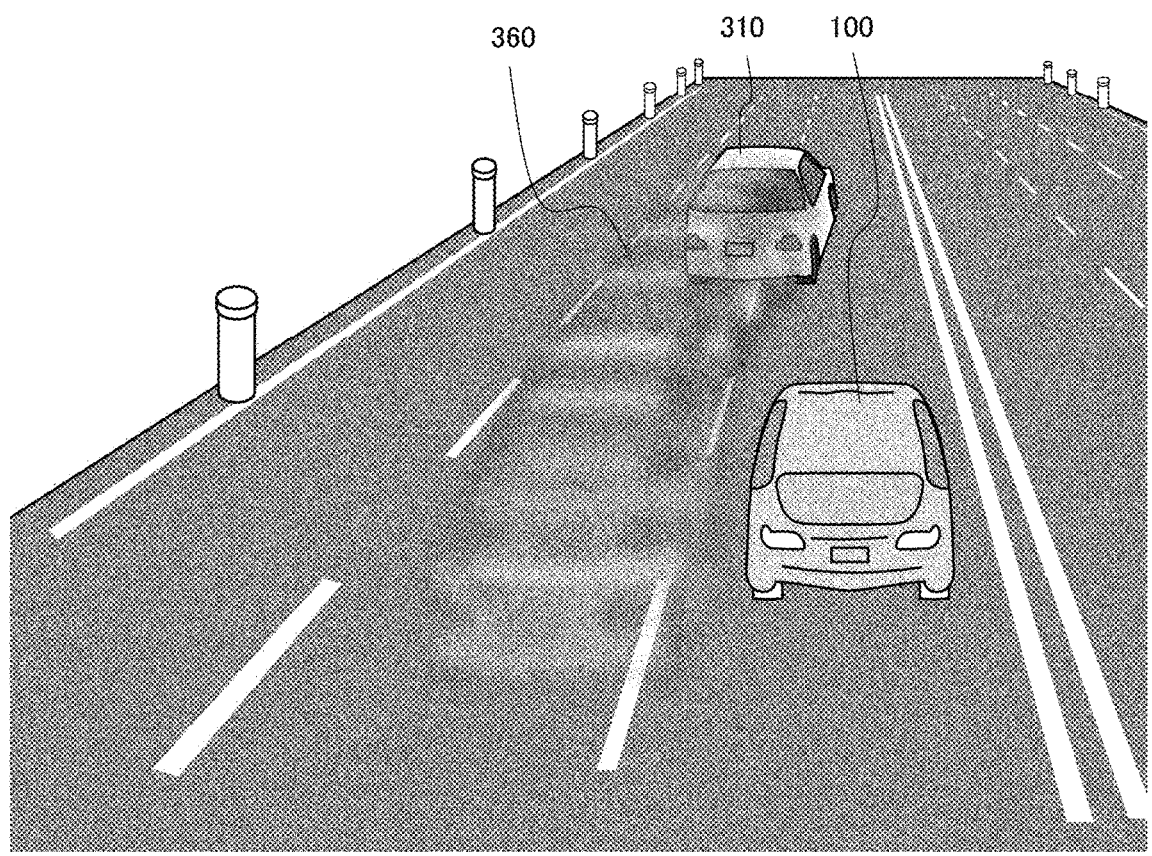
FIG. 4 is a view illustrating a modified example of the first display image in one embodiment.

FIG. 4 is a view illustrating a modified example of the first display image in one embodiment.

A blurring image 360 in FIG. 4 is an image expressing how the peripheral moving body 310 is moving by adding a blur effect to the ghost 312, the ghost 314, the ghost 316, and the like. The blurring image can be expressed by various types of processing other than the processing described above as a matter of course. A video easier for the operator (driver) to understand can be provided by displaying such an effect.

Figure 5:
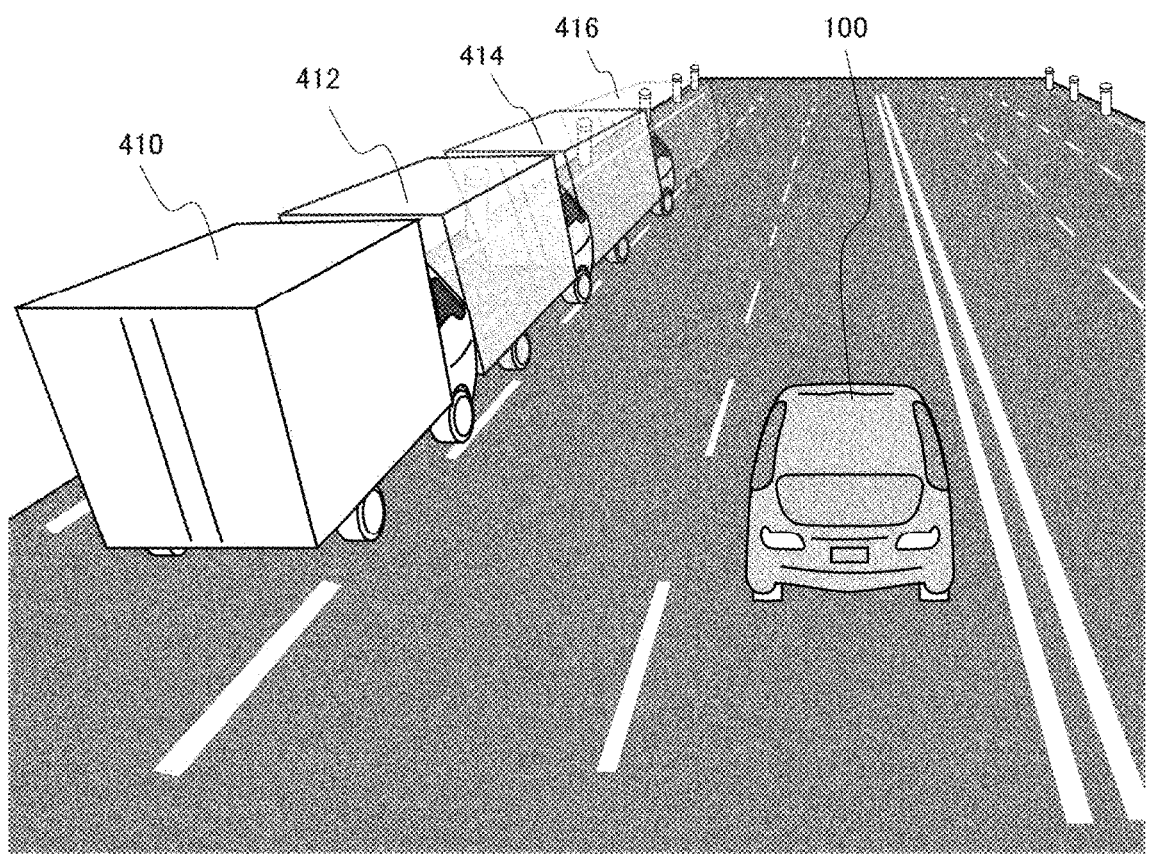
FIG. 5 is a view illustrating an example of a second display image in one embodiment.

FIG. 5 is a view illustrating an example of a second display image in one embodiment. FIG. 5 illustrates an example in which a peripheral moving body 410 is a truck and the speed thereof is lower than the virtual moving body 100. In this case, the peripheral moving body 410 at the current time point is displayed and a ghost 412, a ghost 414, and a ghost 416, which are in a descending chronological order, are displayed in front of the peripheral moving body 410. Note that when the peripheral moving body 410 is a truck and the speed thereof is lower than the virtual moving body 100, the ghost 412, the ghost 414, and the ghost 416 may not be displayed. When the speed of the peripheral moving body 410 is lower than the virtual moving body 100 as described above, the ghosts overlap a front portion of the truck and humans sometimes have difficulty in recognizing the shape of truck (peripheral moving body 410). Thus, in such a situation, the ghosts are sometimes not displayed to allow humans to recognize the shape of the truck (peripheral moving body 410) more clearly than the moving condition of the truck. Moreover, when the absolute value of the speed of the peripheral moving body 410 relative to the virtual moving body 100 is smaller than a predetermined value, the overlapping of the ghosts is intense and humans sometimes have difficulty in recognizing the shape of the truck. Thus, in such a situation, the ghosts are sometimes not displayed to allow humans to recognize the shape of the truck more clearly than the moving condition of the truck.

As described above, an effect added to the display of the peripheral moving body 410 may be changed when the speed of the peripheral moving body 410 relative to the virtual moving body 100 satisfies a certain condition.

Since the interval time d and the transparency Δ % are the same as those in FIG. 3, description thereof is omitted.

Figure 6:
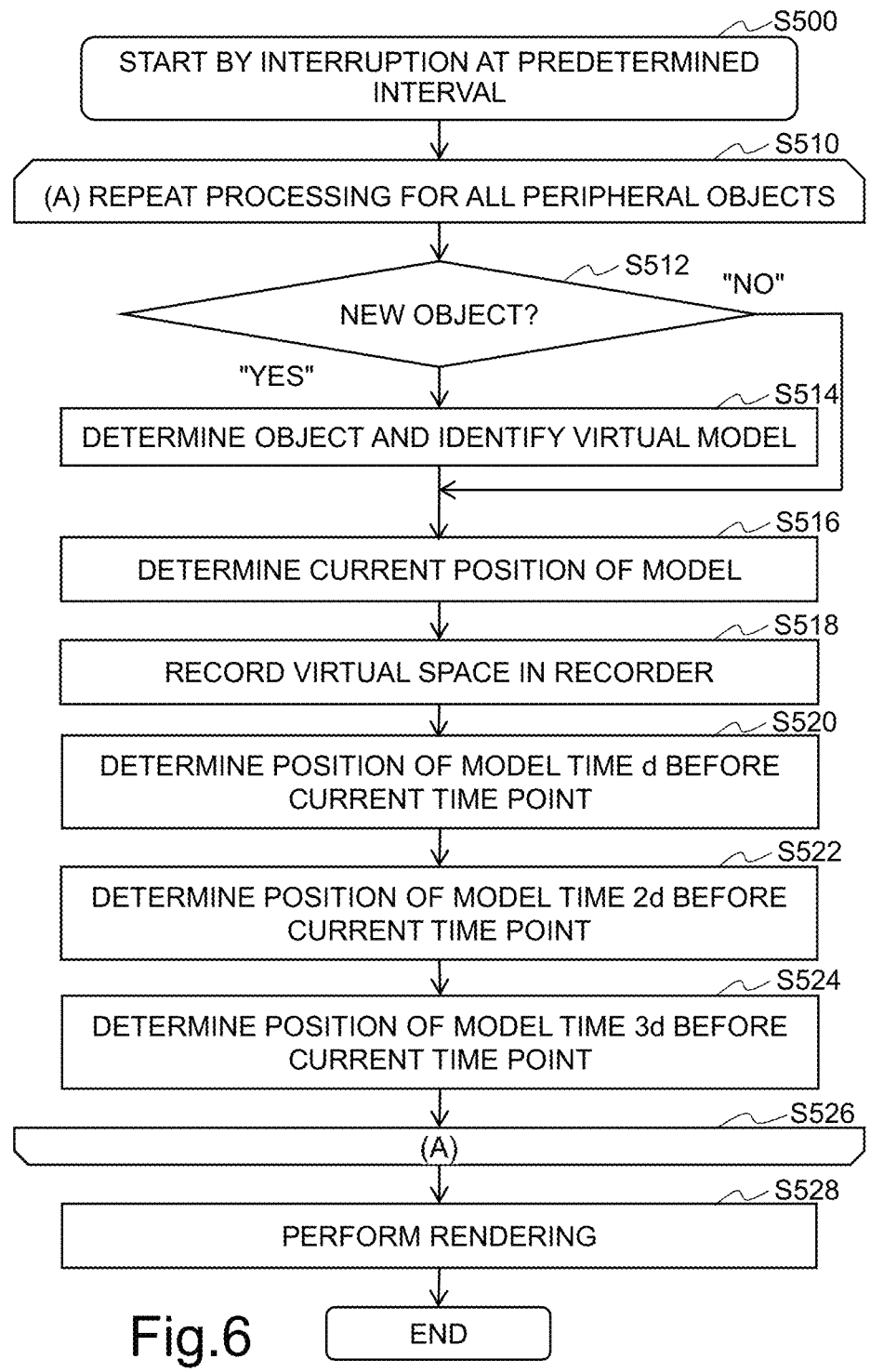
FIG. 6 is a first flowchart of displaying ghosts of a peripheral moving body in one embodiment.

FIG. 6 is a first flowchart of displaying the ghosts of the peripheral moving body in one embodiment. Each step is described below.

[Step S500] A processing flow of the embodiment may be started by an interruption at a predetermined interval. Note that a trigger for starting the processing is not limited to the interruption. The processing proceeds to step S510.

[Step S510] Processing of steps between step S510 and step S526 is repeated for all peripheral objects.

[Step S512] For example, whether an object recognized by pattern recognition based on the videos of the cameras mounted in the actual moving body 100R is a new object is determined. When the object is a new object ("Yes"), the processing proceeds to step S514. When the object is a recognized object and is not a new object ("NO"), the processing proceeds to step S516.

[Step S514] The new object is determined and a corresponding virtual model is identified. When the object to be recognized is a new object, the vehicle type of the object or the kind of the object is determined by using techniques such as pattern recognition and machine learning and a model corresponding to the object is identified. In the pattern recognition, for example, in the case of the moving body, a vehicle type with the closest characteristics is identified based on characteristics such as the positions of the headlamps and various design features of the vehicle body. A 3D model of the identified vehicle type is obtained by searching the 3D model database 240 for the 3D model based on the identified vehicle type. Characteristics of the stationary poles 330 on the road are also extracted, the object recognition is performed for the poles 330, and 3D models thereof are searched for and obtained. The obtained 3D models are used in the rendering and the construction of the virtual space. Next, the processing proceeds to step S516.

[Step S516] The object is determined and a virtual model is identified. The virtual model is arranged at an appropriate position in the virtual space 150 based on the position of one or more recognized objects. Next, the processing proceeds to step S518.

[Step S518] The virtual space is recorded in a recorder. When recording of the virtual space is instructed by the operator (driver) or the like, the virtual space at that time point is stored in the memory 704 or the storage medium 760. Next, the processing proceeds to step S520.

[Step S520] The position of the model of the peripheral moving body the time d before the current time point is determined. The position in this case is desirably set such that the position relative to the virtual moving body 100 is maintained and the positional relationship to the stationary road or the roadside poles 330 may change. The operator (driver) can thereby grasp the past positional relationship between the host virtual moving body 100 and the other peripheral moving body. Next, the processing proceeds to step S522.

[Step S522] The position of the model of the peripheral moving body a time 2d before the current time point is determined. The other processing is the same as that in step S520. Next, the processing proceeds to S524.

[Step S524] The position of the model of the peripheral moving body a time 3d before the current time point is determined. The other processing is the same as that in step S520. Although only the processing for the peripheral moving body of the time 3d before the current time point is described in the embodiment illustrated in FIG. 6, how far in the past to go back to process the model of the moving body may be determined in advance. Accordingly, the processing in the embodiment is not limited to that in FIG. 6. Next, the processing proceeds to step S526.

[Step S526] When there is any other unprocessed object, the processing returns to step S510. When there is no other unprocessed object, the processing proceeds to step S528.

[Step S528] The two-dimensional video of the virtual space 150 captured from the virtual camera 130 is rendered. Note that the rendering is performed with the transparency of the model the time d before the current time point increased by Δ %, the transparency of the model the time 2d before the current time point increased by 2Δ %, and the transparency of the model the time 3d before the current time point increased by 3Δ % from the transparency of the peripheral moving body at the current time point, and the image illustrated in FIG. 3 is thereby obtained. Although description is given of the example in which the past models are generated at even intervals d, the intervals may not be even. Moreover, instead of increasing each transparency at a predetermined ratio, the transparencies of the respective past models may be individually varied in consideration of the characteristics of the display device and the like.

By performing the aforementioned processing, as illustrated in FIG. 3, the peripheral moving body 312 at a time point of the time d before the current time point is displayed to follow the image of the current peripheral moving body 310 with the transparency thereof increased by Δ %. The past peripheral moving body 314 and the past peripheral moving body 316 are as described above and description thereof is thus omitted.

A video in which the peripheral moving bodies (312, 314, 316) at multiple past time points move to smoothly follow the peripheral moving body 310 is generated by using the processing of FIG. 6.

Performing the processing of FIG. 6 enables display which allows the operator (driver) to more easily understand how the peripheral moving body is moving relative to the virtual moving body 100.

Note that, in order to display blurring as in FIG. 4, the peripheral moving bodies (312, 314, 316) at multiple past time points may be displayed in a blurred manner. Alternatively, the past ghosts illustrated in FIG. 7 may be displayed in a blurred manner. Note that expression of blurring is not limited to these methods.

Figure 7:
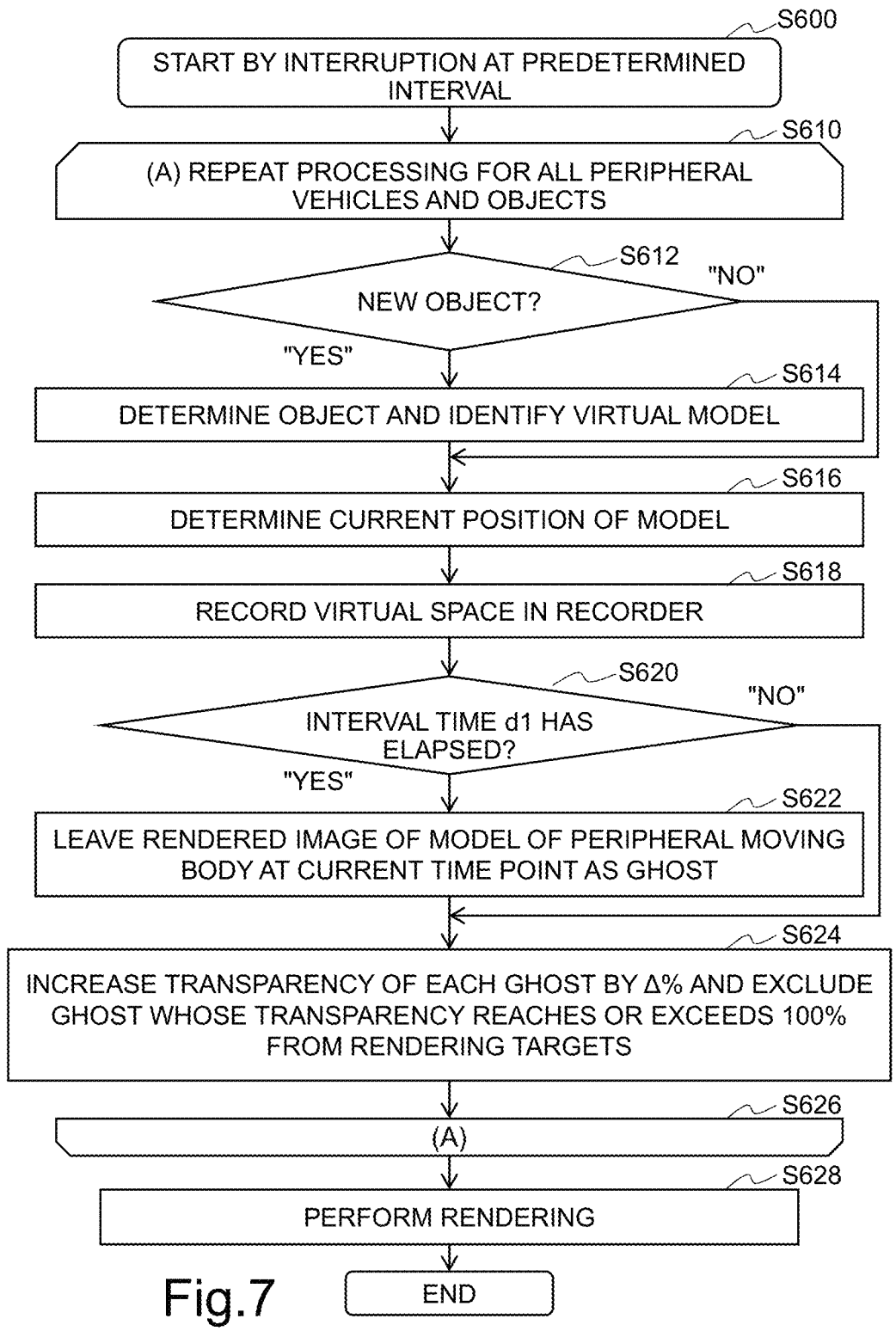
FIG. 7 is a second flowchart of displaying the ghosts of the peripheral moving body in one embodiment.

FIG. 7 is a second flowchart of displaying the ghosts of the peripheral moving body in one embodiment. Each step is described below.

[Step S600] A processing flow of the embodiment may be started by an interruption at a predetermined interval. Note that a trigger for starting the processing is not limited to the interruption. The processing proceeds to step S610.

[Step S610] Processing of steps between step S610 and step S626 is repeated for all peripheral objects.

[Step S612] For example, whether an object recognized by pattern recognition based on the videos of the cameras mounted in the actual moving body 100R is a new object is determined. When the object is a new object ("Yes"), the processing proceeds to step S614. When the object is a recognized object and is not a new object, the processing proceeds to step S616.

[Step S614] The new object is determined and a corresponding virtual model is identified. When the object to be recognized is a new object, the vehicle type of the object or the kind of the object is determined by using the technique of pattern recognition and a model corresponding to the object is identified. In the pattern recognition, for example, in the case of the moving body, a vehicle type with the closest characteristics is identified based on characteristics such as the positions of the headlamps and various design features of the vehicle body. A 3D model of the identified vehicle type is obtained by searching the 3D model database for the 3D model based on the identified vehicle type. Characteristics of the stationary poles 330 on the road are also extracted, the object recognition is performed for the poles 330, and 3D models thereof are searched for and obtained. The obtained 3D models are used in the rendering and the construction of the virtual space. Next, the processing proceeds to step S616.

[Step S616] The object is determined and a virtual model is identified. The virtual model is arranged at an appropriate position in the virtual space 150 based on the position of one or more recognized objects. Next, the processing proceeds to step S618.

[Step S618] The virtual space is recorded in the recorder. When recording of the virtual space is instructed by the operator, the virtual space at that time point is stored in the memory 704 or the storage medium 760. Next, the processing proceeds to step S620.

[Step S620] Whether the interval time dl has elapsed is checked. When the interval time dl has elapsed ("Yes"), the measurement of interval is reset to zero and the processing proceeds to step S622. When the interval time dl has not elapsed ("No"), the processing proceeds to step S624.

[Step S622] A rendered image of a model of the peripheral moving body at the current time point is left as a ghost. The processing proceeds to step S622. Multiple ghosts are generated one by one every interval time dl by this step.

[Step S624] The transparency of each of the ghosts is increased by Δ %. The ghost whose transparency reaches or exceeds 100% may be excluded from the rendering targets. The positional relationships of the ghosts to the virtual moving body 100 are desirably maintained. Note that the ghost a predetermined time before or more may be excluded from the rendering targets even when the transparency thereof does not reach or exceed 100%. Note that the rendering may be performed at once in step S628. The processing proceeds to step S626.

[Step S626] When there is any other unprocessed object, the processing returns to step S610. When there is no other unprocessed object, the processing proceeds to step S628.

[Step S628] The two-dimensional video of the virtual space 150 captured from the virtual camera 130 is rendered. Note that the rendering is performed with the transparency of the ghost the time d before the current time point increased by Δ %, the transparency of the ghost the time 2d before the current time point increased by 2Δ %, and the transparency of the ghost the time 3d before the current time point increased by 3Δ %, and the image illustrated in FIG. 3 can be thereby obtained. Although description is given of the example in which the ghosts are generated at even intervals dl, the intervals may not be even. Moreover, instead of increasing each transparency at a predetermined ratio, the transparencies of the respective past models may be individually varied in consideration of the characteristics of the display device and the like.

By performing the aforementioned processing, as illustrated in FIG. 3, the image of the current peripheral moving body 310 is displayed while leaving multiple ghosts at the intervals of time dl with the transparency of each of the ghosts increased by Δ % from the previous one.

The ghosts (312, 314, 316) of the peripheral moving body 310 are generated every interval time dl by using the processing of FIG. 7.

Performing the processing of FIG. 7 enables display which allows the operator (driver) to more easily understand how the peripheral moving body is moving relative to the virtual moving body 100.

<Hardware Configuration>

Figure 8:
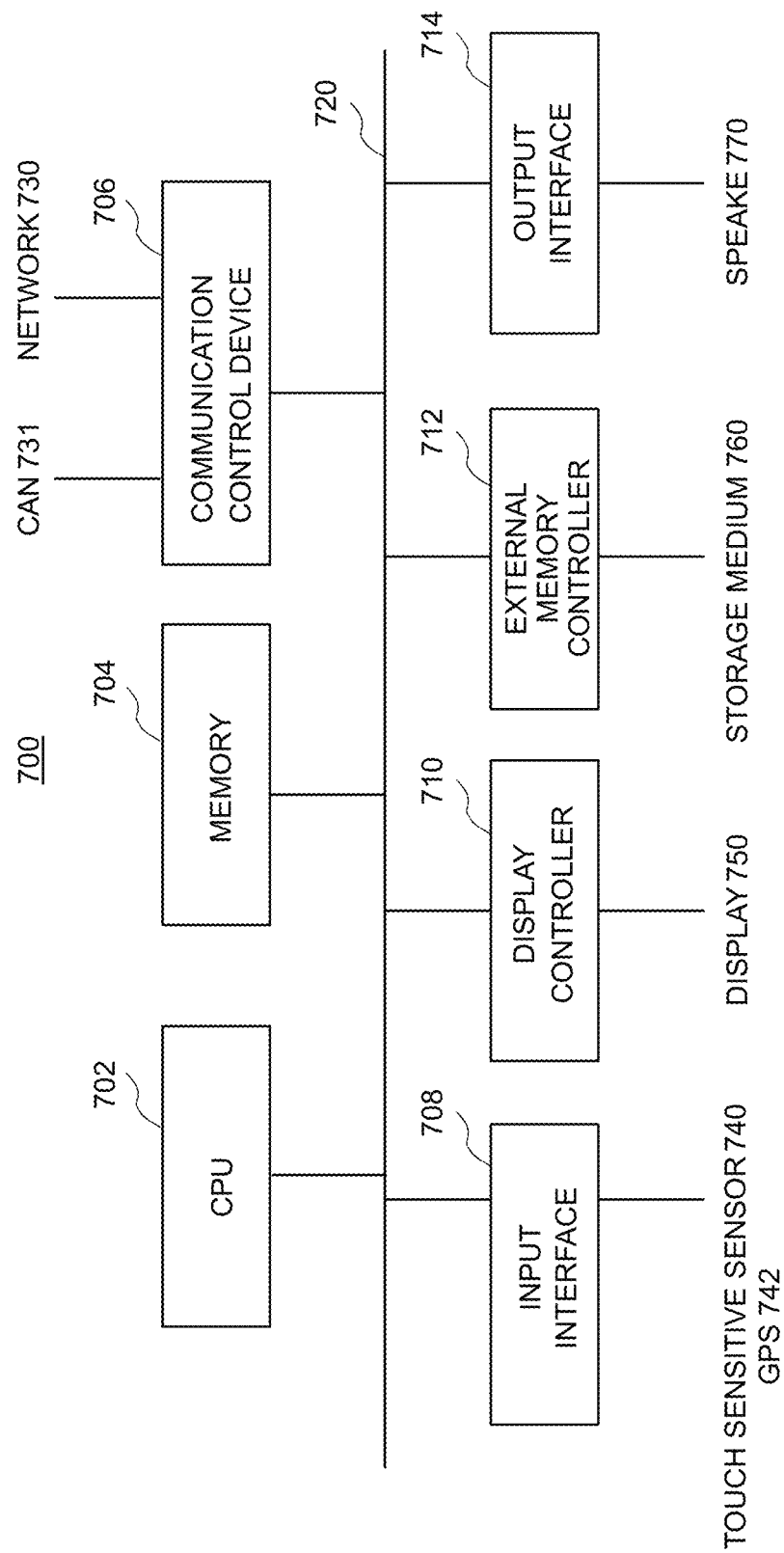
FIG. 8 is a diagram illustrating a hardware configuration.

FIG. 8 is a diagram illustrating a hardware configuration 700 in one embodiment.

The hardware configuration 700 includes a CPU 702, the memory 704, a communication control device 706, an input interface 708, a display controller 710, an external memory controller 712, and an output interface 714.

Networks such as the Internet, a CAN 731 (controller area network), and the like are connected to the communication control device 706. A touch sensitive sensor 740, a GPS 742, a camera 744, and the like are connected to the input interface 708. A display 750 is connected to the display controller 710. The external memory controller 712 can read data from and write data to the storage medium 760. A speaker 770 and the like are connected to the output interface.

The storage medium 760 may be a RAM, a ROM, a CD-ROM, a DVD-ROM, a hard disk, a memory card, or the like.

A program of the embodiment described above may be executed by a computer having the hardware configuration 700. Moreover, the program of the embodiment may be implemented as a method to be executed by a computer. Part or all of the program of the embodiment may be executed by an operating system. Moreover, part of the program may be implemented by hardware. The program may be stored in the storage medium 760 or the memory 704.

Note that the steps of the program in the aforementioned embodiment may be executed simultaneously or with the order thereof changed as long as there is no contradiction.

The aforementioned embodiment may be implemented as a hardware device.

The aforementioned embodiment does not limit the invention described in the claims and is treated as an example as a matter of course.

What is claimed is:

1. A moving body position information recognition display device comprising:
    a traveling state obtaining part configured to obtain information on a traveling state of a host moving body including a position and speed of the host moving body;
    an object information obtaining part configured to obtain information on a plurality of objects including a shape of a travel road and another moving body present in a periphery of the host moving body;
    a virtual space construction part configured to construct a virtual space by associating at least the host moving body and each of the plurality of objects respectively with each of a plurality of virtual models and by arranging the associated virtual models in a three-dimensional space based on the information obtained from the traveling state obtaining part and the object information obtaining part; and
    a two-dimensional video generation part configured to generate a two-dimensional video capturing the virtual space from a virtual camera arranged in the virtual space and output the two-dimensional video for a display screen, wherein
    the two-dimensional video generation part generates the two-dimensional video while adding a predetermined effect to display of the virtual model corresponding to the object in the two-dimensional video depending on speed of the object relative to the host moving body, and the effect is a discretely-displayed ghost whose transparency increases over time, or a trajectory.

2. The moving body position information recognition display device according to claim 1, wherein
    when the effect is a discretely-displayed ghost whose transparency increases over time, the ghost is a video of the virtual model at a time point a predetermined time before a current time point, and
    the longer the predetermined time is, the higher the transparency of the video of the virtual model is.

3. The moving body position information recognition display device according to any one of claim 1, wherein the effect is not added to the virtual model corresponding to the object coming toward the host moving body, the object whose absolute value of speed relative to the host moving body or absolute value of speed change relative to the host moving body is smaller than a predetermined value, the object whose speed is lower than the host moving body, or the object which is stationary.

4. The moving body position information recognition display device according to any one of claim 2, wherein the effect is not added to the virtual model corresponding to the object coming toward the host moving body, the object whose absolute value of speed relative to the host moving body or absolute value of speed change relative to the host moving body is smaller than a predetermined value, the object whose speed is lower than the host moving body, or the object which is stationary.

5. The moving body position information recognition display device according to any one of claim 1, further comprising a recording part configured to record the virtual space or the two-dimensional video.

6. A non-transitory computer-readable medium storing a moving body position information recognition display program causing a computer to execute a process, the process comprising:
   obtaining information on a traveling state of a host moving body including a position and speed of the host moving body;
   obtaining information on a plurality of objects including a shape of a travel road and another moving body present in a periphery of the host moving body;
   constructing a virtual space by associating at least the host moving body and each of the plurality of objects respectively with each of a plurality of virtual models and by arranging the associated virtual models in a three-dimensional space based on the information obtained in the obtaining information on a traveling state of a host moving body e and the obtaining information on a plurality of objects; and
   generating a two-dimensional video capturing the virtual space from a virtual camera arranged in the virtual space and outputting the two-dimensional video for a display screen, wherein
   the generating the two-dimensional video generates the two-dimensional video while adding a predetermined effect to display of the virtual model corresponding to the object in the two-dimensional video depending on speed of the object relative to the host moving body, and the effect is a discretely-displayed ghost whose transparency increases over time, or a trajectory.

* * * * *